(12) United States Patent
Noto et al.

(10) Patent No.: US 8,113,550 B2
(45) Date of Patent: Feb. 14, 2012

(54) CONNECTION WITH TAIL PIECE FOR A PRESS-FITTING

(75) Inventors: Steven J. Noto, Granger, IN (US); James A. LaFortune, Elkhart, IN (US); Scott L. Spence, Elkhart, IN (US)

(73) Assignee: NIBCO Inc., Elkhart, IN (US)

( * ) Notice: Subject to any disclaimer, the term of this patent is extended or adjusted under 35 U.S.C. 154(b) by 189 days.

(21) Appl. No.: 12/331,032

(22) Filed: Dec. 9, 2008

(65) Prior Publication Data

US 2009/0146418 A1    Jun. 11, 2009

Related U.S. Application Data

(60) Provisional application No. 61/012,501, filed on Dec. 10, 2007.

(51) Int. Cl.
*F16L 13/14* (2006.01)

(52) U.S. Cl. .......... 285/386; 285/374; 285/382; 29/512; 29/523

(58) Field of Classification Search ............. 285/353, 285/384, 256, 354, 382, 386, 374; 29/511, 29/512, 507, 523
See application file for complete search history.

(56) References Cited

U.S. PATENT DOCUMENTS

| | | | |
|---|---|---|---|
| 549,510 A * | 11/1895 | Hall | 285/354 |
| 685,694 A * | 10/1901 | Schamp | 285/354 |
| 946,703 A * | 1/1910 | Nelson | 285/354 |
| 1,936,552 A * | 11/1933 | Goss | 285/354 |
| 2,250,286 A * | 7/1941 | White | 285/256 |
| 2,572,645 A * | 10/1951 | Melsom | 285/256 |
| 2,686,066 A * | 8/1954 | Paquin | 285/256 |
| 3,425,452 A * | 2/1969 | Shaw | 285/382.2 |
| 3,514,134 A * | 5/1970 | Shurtleff et al. | 285/382 |
| 3,549,180 A * | 12/1970 | MacWilliam | 285/256 |
| 3,615,109 A * | 10/1971 | Brinda et al. | 285/354 |
| 3,997,193 A * | 12/1976 | Tsuda et al. | 285/353 |
| 4,902,049 A * | 2/1990 | Umehara | 285/424 |
| 5,090,743 A | 2/1992 | Obering | |
| 5,303,964 A * | 4/1994 | Yi | 285/354 |
| 5,417,461 A * | 5/1995 | Dougherty et al. | 285/256 |
| 5,484,174 A * | 1/1996 | Gotoh et al. | 285/382 |
| 5,716,079 A * | 2/1998 | Bartholomew | 285/354 |
| 6,082,784 A * | 7/2000 | Fukaya | 285/382 |
| 6,286,556 B1 * | 9/2001 | Kato | 285/354 |
| 6,439,478 B1 * | 8/2002 | King et al. | 285/354 |
| 6,447,026 B2 * | 9/2002 | Palvoelgyi | 285/354 |
| 6,619,701 B1 * | 9/2003 | Udhofer | 285/256 |
| 7,708,318 B2 * | 5/2010 | Thrift et al. | 285/256 |
| 2007/0215828 A1 | 9/2007 | Cellemme et al. | |

* cited by examiner

*Primary Examiner* — David E Bochna
(74) *Attorney, Agent, or Firm* — Price Heneveld LLP

(57) ABSTRACT

An adapter integrates a tail piece and connection for coupling to plumbing fittings utilizing a union nut or flange and provides a press-fit connection to the tail piece for installation in the system. The method of manufacturing the adapter comprises the steps of forming a flange on a section of conduit; placing a threaded union nut or mounting flange over the flange fitting; roll-forming an internal, concave annular recess into the section of conduit extending from the nut and inserting an O-ring into the recess for completing the adapter. The adapter can then be sealably attached to a plumbing fitting, such as a valve or the like, utilizing a conventional flat gasket between the flange of the adapter and the plumbing fitting. The installation is completed by inserting a conduit into the adapter to clear the O-ring and crimping the bead formed by the recess to complete the sealed connection.

14 Claims, 2 Drawing Sheets

CONNECTION WITH TAIL PIECE FOR A PRESS-FITTING

CROSS-REFERENCE TO RELATED APPLICATIONS

This application claims priority under 35 U.S.C. §119(e) on U.S. Provisional Application No. 61/012,501 entitled CONNECTION WITH TAIL PIECE FOR A PRESS FITTING, filed on Dec. 10, 2007, by Steven J. Noto and James A. LaFortune, the entire disclosure of which is incorporated herein by reference.

BACKGROUND OF THE INVENTION

The present invention relates to a pipe fitting and particularly to a union or flange connection, which includes a tail piece for press-fitting.

Typically, connections to pipe fittings utilizing threaded nuts employ a flange fitting with a gasket leading to a tail piece, which includes a socket for soldering a pipe conduit thereto. These connections allow the coupling of copper or bronze conduits to a variety of plumbing fittings, such as elbows, T's, valves, and the like, in a disconnectable manner. Such convenience is frequently required in a given plumbing installation, however, there exists a need for a coupling which will allow an easier connection to a piping system by employing a press-fitted connection. This would allow the installer to more easily integrate a plumbing fitting, such as valves, into a system without requiring soldering or other labor-intensive measures.

SUMMARY OF THE INVENTION

The present invention solves this problem by, according to one aspect of the invention, a method of forming an adapter which integrates a tail piece and union or flange connection to allow coupling to a variety of plumbing fittings utilizing an adapter which provides a press-fit connection to the tail piece of the adapter for installation in the system.

The method of manufacturing the adapter comprises the steps of forming a flange on one end of a section of conduit; placing a threaded nut or mounting flange over the formed flange; subsequently roll-forming an internal, concave annular recess or bead near the opposite end of the conduit; and inserting an O-ring into the bead for completing the adapter. The adapter can then be sealably attached to a plumbing fitting, such as a valve or the like, utilizing a seal, such as a gasket between the adapter and the fitting to which it is coupled. The installation is completed by inserting a conduit into the opposite end with the O-ring and crimping the bead utilizing a crimping tool to complete the sealed connection. Adapters embodying the present invention include a section of conduit including a flange at one end and a threaded nut or mounting flange extending over the flange, an internal annular recess formed in an end spaced from said flange for receiving an O-ring for providing a press-fit adapter for a plumbing installation.

These and other features, objects and advantages of the present invention will become apparent upon reading the following description thereof together with reference to the accompanying drawings.

DETAILED DESCRIPTION OF THE PREFERRED EMBODIMENT

Figure 1:
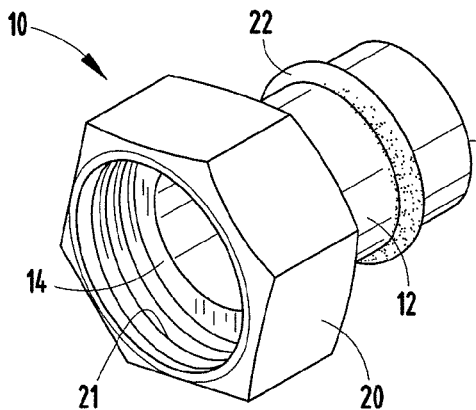
FIG. 1 is a perspective view of one end of an adapter embodying the present invention.
Figure 2:
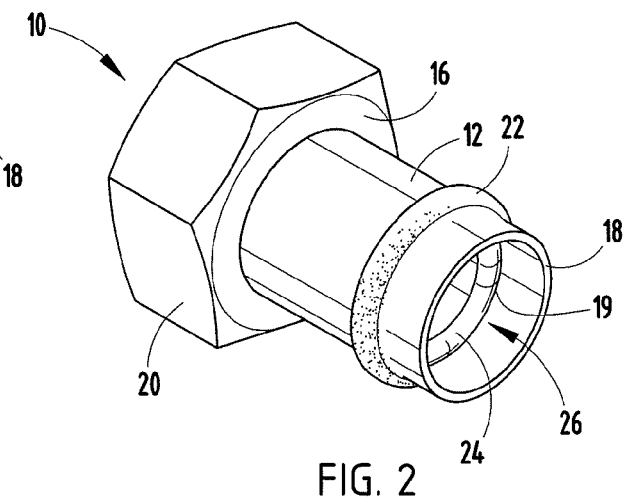
FIG. 2 is a perspective view of the opposite end of the adapter shown in FIG. 1.

Referring initially to FIGS. 1 and 2, there is shown an adapter 10 embodying the present invention, which includes a section of tubing or conduit 12 including a flange 14 at one end which fits against the annular rim 16 of a union nut 20. Spaced inwardly from the opposite end 18 of tubing 12 and spaced from flange 14 is an internal concave annular recess 19 formed by roll-forming a bead 22 outwardly to form the recess 19. Subsequently, an O-ring 24 is placed within recess 19 to complete the adapter. The adapter can then be threadably attached to any mating plumbing fitting, such as valves, including a metering valve, threaded T's, elbows, and the like, utilizing a conventional flat sealing washer (not shown) which engages the face of flange 14 within the threaded section 21 of nut 20 to provided a sealed connection.

A conventional conduit is then pushed into the open end 26 of opposite end 18 of adapter 10 and subsequently crimped utilizing a crimping tool, such as a commercially available crimping gun. In view of the flange 14 and bead 22, the sequence of manufacturing of adapter 10 is important since, depending on the size of nut 20, the flange and bead outer diameter, it may not be possible to utilize a press-fit coupling with a union nut. The process of manufacturing the adapter 10, shown in FIGS. 1 and 2, to assure a press-fit coupling to a union nut is illustrated in FIGS. 3-8 and is now described.

Figure 3:
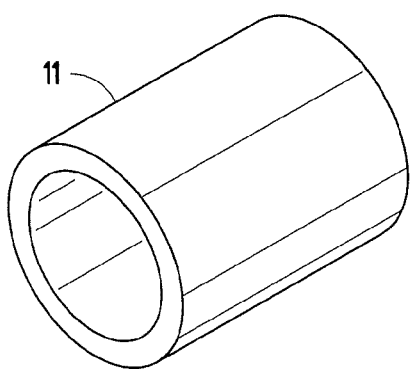
FIGS. 3-8 are perspective views and cross-sectional drawings illustrating the sequence in the process of forming the adapter shown in FIGS. 1 and 2.
Figure 4:
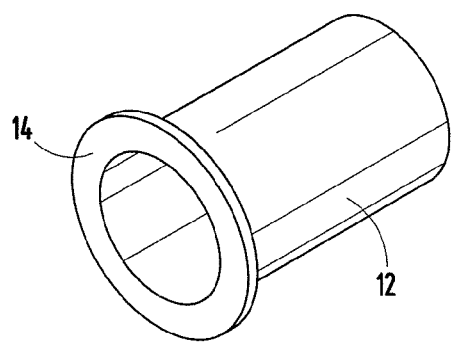
Figure 5:
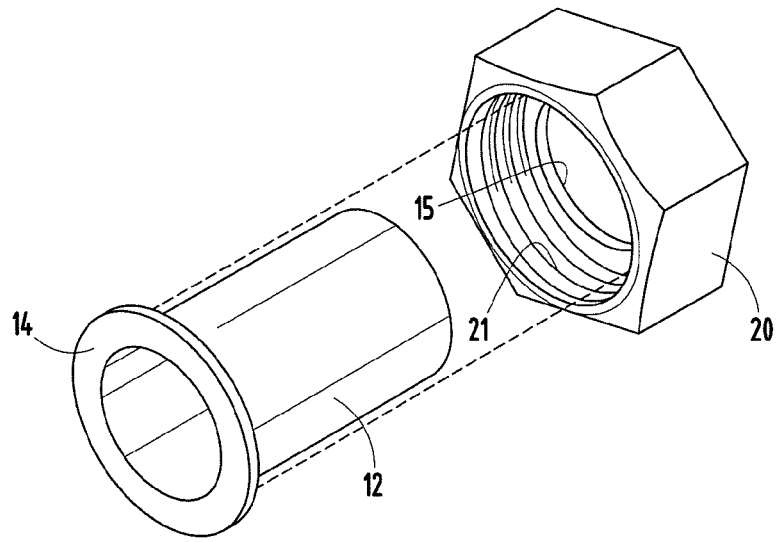
Figure 6:
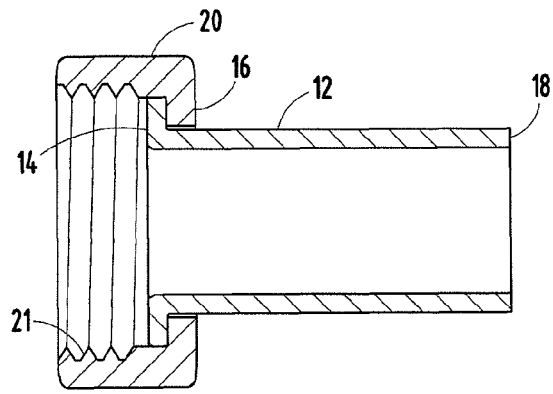

In FIG. 3, a section of conduit 11 is the starting point and is a thick walled tube section placed in an automated lathe to cut away the side wall leaving a flange 14 integrally remaining on one end of conduit 12, as illustrated in FIG. 4. In some applications, such as smaller diameter applications, a solid rod stock is employed and center drilled to form the conduit. Alternatively, flange 14 may be forged as a section of standard conduit. Subsequently, the threaded union nut 20, as shown in FIG. 5, is placed over conduit 12 with flange 14 nesting against the inside of collar 16 of nut 20, as shown in FIG. 6.

Figure 7:
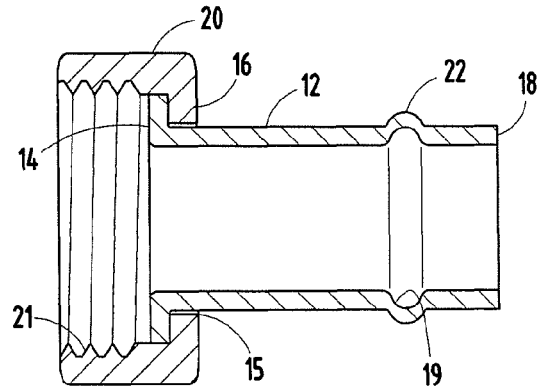
Figure 8:
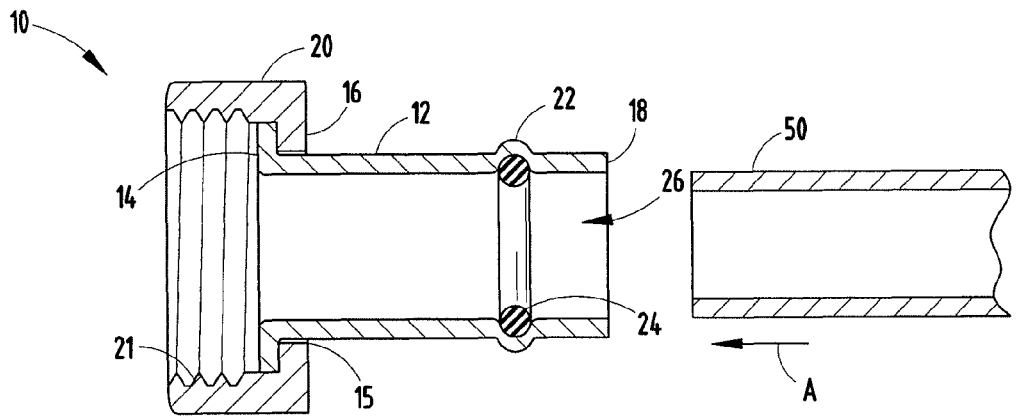

As shown in FIG. 7, next, the internal annular concave recess 19 is formed. Finally, as illustrated in FIG. 8, an O-ring, such as O-ring 24, is seatably inserted within the recess 19 to ready the adapter 10 for application to a pipe fitting and for receiving a conduit 50 advanced in the direction of arrow A in FIG. 8 into open end 26 of adapter 10 for press-fitting conduit 50 to the adapter 10. A flat washer is inserted within the threaded end 21 of nut 20 to seal the adapter 10 to a threaded plumbing fitting to which adapter 10 is threadably attached.

In one preferred embodiment of the invention, the roll-forming of recess 19 is achieved by employing a commercially available rotary tube end forming machine. The length of conduit 12 depends upon its diameter and is typically made of copper, such as C12200 copper, having an internal diameter of from about ½ inch to about 2 inches. The length is from about 1¼ inch to about 3 inches, respectively. The nut 20 typically is made of bronze, such as C84400, while the O-ring is typically a rubber O-ring, such as an EPDM O-ring.

Figure 9:
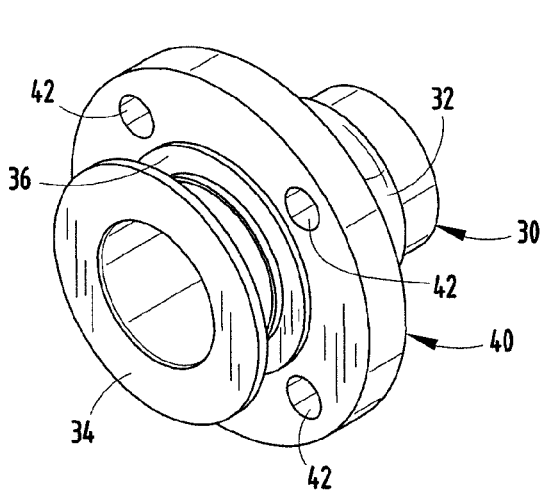
FIG. 9 is a perspective view of one end of an adapter for a flange coupling.
Figure 10:
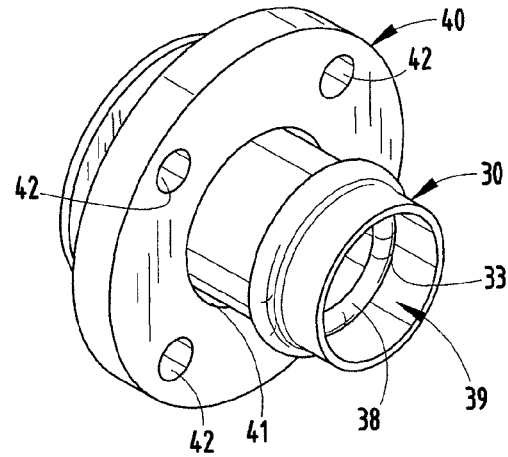
FIG. 10 is a perspective view of the opposite end of the adapter shown in FIG. 9.

FIGS. 9 and 10 illustrate an alternative embodiment of the invention which is employed with a larger diameter adapter 30, which is formed in a manner similar to that of the first embodiment by first forming a flange 34 at one end of the conduit body 32 of adapter 30. A sealing gasket 36 is positioned adjacent flange 34, as seen in FIG. 9, behind which there is placed a mounting flange 40 having a plurality of apertures 42 which allow flange 40 to be attached to a mating flange of a plumbing fitting, such as a ball valve or the like. Once flange 40, having a central aperture 41 which fits over cylindrical body 32 of adapter 30, is positioned on the adapter 30, a roll-formed concave internal annular recess 33 is formed near the end of body 32 opposite flange 34. Subsequently, an O-ring seal 38 is positioned within the concave recess 33, as seen in FIG. 10, to allow a press-fit pipe connection to the adapter as in the first embodiment.

During an installation, the mounting flange 40 is first secured to a corresponding mating mounting flange of a ball valve or the like utilizing conventional threaded fasteners, such as bolts with lock washers and nuts, to provide a sealed connection between adapter 30 and a valve or other pipe fitting to which the adapter is secured. Subsequently, a conduit is inserted into the open end 39 of adapter 30 a distance to position the conduit past O-ring seal 38 and the bead 32 formed by recess 33 is subsequently crimped to complete the sealed connection.

Typically, the outer diameter of bead 22 or 32 is larger than the inner diameter of either the union nut 20 or mounting flange 40, respectively. In such case, the union nut 30 or mounting flange 40 is captively held to adapter 10 between flange 14 or 34 and bead 22 or 32. In some instances, the diameter of opening 15 in collar 16 may be greater than the outer diameter of bead 22. In such case, flange 14 and bead 22 can be formed without first placing the nut over the tail piece, as seen in FIG. 6.

It will become apparent to those skilled in the art that various modifications to the preferred embodiment of the invention as described herein can be made without departing from the spirit or scope of the invention as defined by the appended claims.

The invention claimed is:

1. An adapter for press-fit receiving a conduit for attaching the conduit to a plumbing fitting comprising:
   a section of conduit having a flange formed at one end for engagement by a coupling;
   a coupling comprising a union nut having a threaded end and a collar at an opposite end, said nut extending over said conduit adjacent said flange such that said flange engages said collar;
   an internal annular recess formed in said conduit in spaced relationship to an end of said conduit opposite from said flange, said annular recess extending radially outwardly for receiving a seal therein, wherein the recess has an outer diameter larger than said collar such that said union nut is captively held between said flange and said outer diameter of said recess; and
   an O-ring seal positioned in said recess and held in position only by said recess.

2. A method of forming an adapter comprising the steps of:
   forming a flange on one end of a section of conduit;
   placing a coupling having an opening over the opposite end of said section of conduit for engaging said flange;
   subsequent to the placing step, forming an internal, concave recess in said conduit in spaced relationship to an end of said conduit opposite said flange which recess has an outer diameter larger than said opening of said coupling such that said coupling is captively held to said adapter; and
   positioning an O-ring in said recess such that said recess is the only structure holding said O-ring in place.

3. The method as defined in claim 2 wherein said placing step places a union nut over said section of said conduit.

4. An adapter comprising:
   an adapter comprising a section of conduit having a flange formed at one end;
   a threaded union nut positioned over said section of conduit and having a collar engaging said flange, said union nut having a threaded section opposite said collar for threadably securing said adapter to a plumbing fitting;
   an internal annular recess formed in said conduit in spaced relationship to an end of said conduit spaced from said flange, said annular recess extending radially outwardly for receiving a seal therein and for captively holding said union nut on said section of conduit;
   a seal positioned in said recess and held in place only by said recess; and
   a conduit inserted into an end of said adapter remote from said flange and sealably engaged by said seal.

5. An adapter and union nut for press-fit receiving a conduit for threadably attaching the conduit to a plumbing fitting utilizing a threaded union nut with an internal collar comprising:
   a section of conduit having a flange formed at one end for engagement by a union nut;
   a union nut positioned over said section of conduit with the internal collar of said union nut engaging said flange and the threaded end facing outwardly for threadably engaging a plumbing fitting;
   an internal annular recess formed in said conduit in spaced relationship to an end of said conduit opposite said flange; and
   a seal positioned in said annular recess therein and held in place only by said recess.

6. The adapter as defined in claim 5 wherein said seal is an O-ring seal.

7. A method of forming an adapter comprising the steps of:
   forming a flange on one end of a section of conduit;
   placing a threaded union nut over the end of the section with a collar of the nut engaging the flange of the conduit;
   subsequently forming an internal, concave annular recess having an outer diameter larger than the diameter of said collar in said conduit in spaced relationship to an end of said conduit opposite said flange such that said union nut is captively held to said adapter; and
   inserting a seal within said annular recess to be held in place only by said recess.

8. The method as defined in claim 7 wherein said inserting step inserts an O-ring seal within said annular recess.

9. An adapter for press-fit receiving a conduit for attaching the conduit to a plumbing fitting utilizing one of a union nut and a mounting flange comprising:
   a section of conduit having a flange formed at one end for engagement by a union nut or a mounting flange;
   a coupling comprising one of a union nut and mounting flange;
   an internal annular recess formed in said conduit in spaced relationship to an end spaced from said flange, said annular recess extending radially outwardly for receiving a seal therein and having an outer diameter greater than the opening in said union nut or mounting flange such that said union nut or mounting flange is captively held between said flange and the outer diameter of said recess; and a seal positioned within and held in place only be said annular recess.

10. The adapter as defined in claim 9 wherein said seal is an O-ring.

11. The adapter as defined in claim 10 wherein said section of conduit is made of copper.

12. The adapter as defined in claim 11 wherein said section of conduit has an internal diameter of from about ½ inch to about 2 inches.

13. The adapter as defined in claim 12 wherein said section of conduit has a length of from about 1¼ inches to about 3 inches.

14. The adapter as defined in claim 13 wherein the inner diameter of said union nut and mounting flange is smaller than the outer diameter of said annular recess of said section of conduit such that said union nut or mounting flange is captively held to said adapter.

* * * * *

UNITED STATES PATENT AND TRADEMARK OFFICE
CERTIFICATE OF CORRECTION

| | | |
|---|---|---|
| PATENT NO. | : 8,113,550 B2 | Page 1 of 1 |
| APPLICATION NO. | : 12/331032 | |
| DATED | : February 14, 2012 | |
| INVENTOR(S) | : Noto et al. | |

It is certified that error appears in the above-identified patent and that said Letters Patent is hereby corrected as shown below:

Column 5, line 1, "be" should be --by--.

Signed and Sealed this
Twenty-fourth Day of April, 2012

David J. Kappos
*Director of the United States Patent and Trademark Office*